Dec. 12, 1967    J. C. ROBINSON    3,357,406
LIVESTOCK WATERING DEVICE

Filed March 29, 1966    6 Sheets-Sheet 1

INVENTOR.
JOHN C. ROBINSON
BY
*Schmieding and Fultz*
ATTORNEYS

Dec. 12, 1967    J. C. ROBINSON    3,357,406
LIVESTOCK WATERING DEVICE
Filed March 29, 1966    6 Sheets-Sheet 3

INVENTOR.
JOHN C. ROBINSON
BY Schmieding and Fultz
ATTORNEYS

INVENTOR.
JOHN C. ROBINSON
BY
Schmieding & Fultz
ATTORNEYS

United States Patent Office 3,357,406
Patented Dec. 12, 1967

3,357,406
LIVESTOCK WATERING DEVICE
John C. Robinson, Radnor, Ohio
Filed Mar. 29, 1966, Ser. No. 543,475
5 Claims. (Cl. 119—73)

This application is a continuation-in-part of my co-pending application Ser. No. 419,473 filed Dec. 18, 1964, now abandoned.

The present invention relates generally to livestock watering devices and in particular to an improved livestock watering device for providing water for livestock, such as hogs and the like.

In general, the improved livestock watering device of the present invention comprises a water trough or bowl provided with a rearwardly sloping inner bottom surface, an efficient water delivery valve assembly attached to the trough, lever means by which the animal can actuate the valve mechanism and an adjustable cover plate to limit the animal's access to only the lower portion of the lever means thereby preventing the overflow of water on the surrounding area. The water trough is aslo provided with an integrally formed heater cavity in which a dry or submergible type heater may be placed to heat the water as it flows into the trough.

As an aspect of the present invention the adjustable cover plate limits the animal's access to the lower portion of the lever means thereby requiring the animal to keep its nostrils deep in the trough to actuate the water flow. This prevents spillage of water on to the surrounding area because as the water level rises the animal must raise his nostrils above the water flow.

As another aspect of the present invention, the novel construction of the livestock watering device permits easy accessibility to the components of the valve assembly without disconnecting the plumbing.

As another aspect of the present invention the lever means is constructed to require only a small force to operate the valve mechanism and includes a low-friction linkage which operates the valve mechanism simply and efficiently thereby permitting even small or young livestock to use the watering device.

As another aspect of the present invention, the novel construction of the trough and the position of the lever means permits the animal to easily learn to operate the valve mechanism that fills the trough.

As another aspect of the present invention the novel construction of the valve assembly incorporates a stationary orifice that prevents corrosion imposed sticking of the valve mechanism, a defect present in conventional devices.

As a further aspect of the present invention, the water trough is provided with an integrally formed heater cavity in which a conventional heating element may be placed to heat the water as it flows into the trough.

It is, therefore, an object of the present invention to provide an improved livestock watering device which eliminates the spillage of water in the pen of barnyard area.

It is another object of the present invention to provide a device of the type described which permits easy accessibility to the components of the valve assembly without disconnecting the plumbing when repair or replacement is necessary.

It is another object of the present invention to provide a device of the type described which incorporates a water delivery valve and actuating lever means that requires only a small actuating force whereby even small animals can operate the device.

It is another object of the present invention to provide a device of the type described wherein the construction of the trough and the position of the lever means is such to permit the animal easily to learn how to operate the valve mechanism to obtain water.

It is still another object of the present invention to provide a device of the type described wherein the valve assembly incorporates a stationary orifice portion which eliminates the possibility of the valve sticking due to corrosion as is prevalent in livestock watering devices in present use.

It is a further object of the present invention to provide a device of the type described which incorporates a water trough provided with a built-in heater cavity for a conventional heating element arranged to heat the water as it flows into the trough.

Further objects and advantages of the present invention will be apparent from the following description, reference being had to the accompanying drawings wherein a preferred form of embodiment of the invention is clearly shown.

Figure 1:
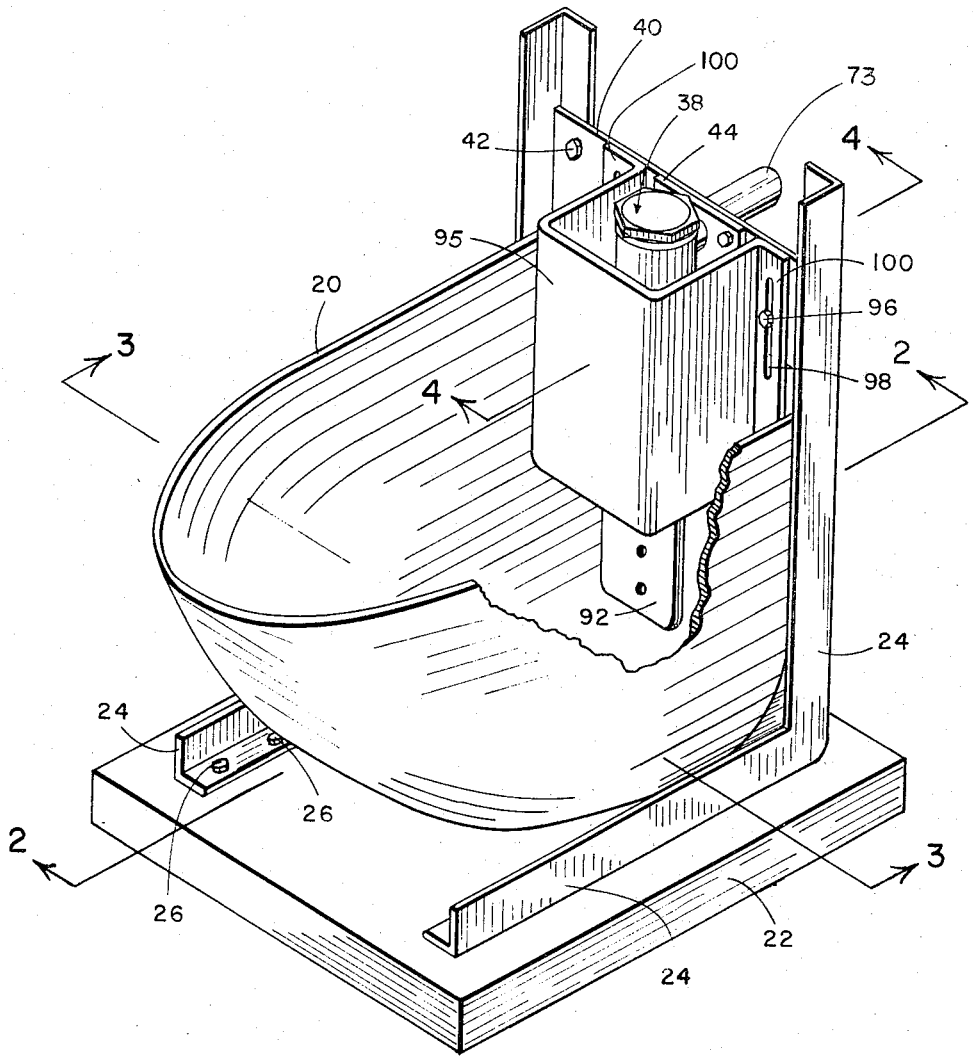
FIG. 1 is a perspective view illustrating a livestock watering device constructed in accordance with the present invention.

Referring in detail to the drawings, a livestock watering device constructed in accordance with the present invention is illustrated in FIG. 1. A water trough or bowl 20 is shown mounted on a base 22 by L-shaped flanges 24 fastened to base 22 by bolts 26.

Figure 2:
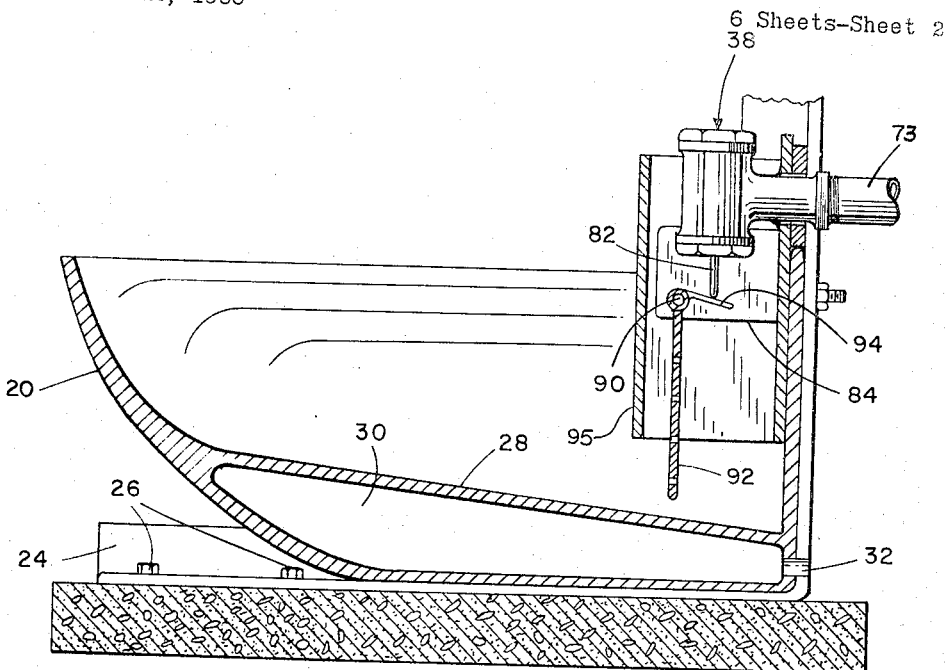
FIG. 2 is a side sectional view of the watering device shown in FIG. 1, the section being taken along the line 2—2 of FIG. 1.
Figure 3:
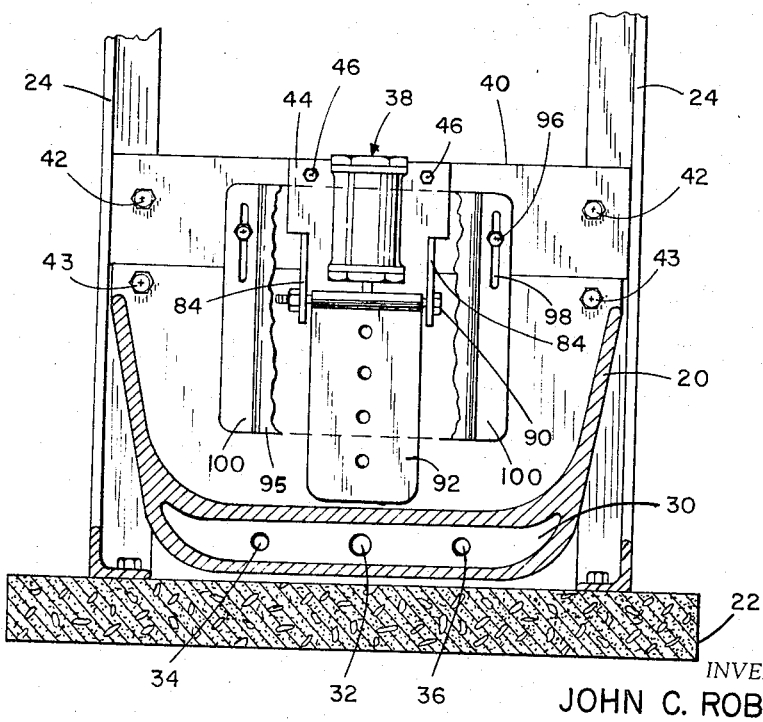
FIG. 3 is a front sectional view of the watering device shown in FIG. 1, the section being taken along the line 3—3 of FIG. 1.

As best seen in FIG 2, trough 20 is provided with an inner bottom surface 28 sloping from front to rear. A built-in heater cavity 30 is located beneath surface 28 and is provided with an opening 32 for a dry or submergible type heater, not shown, to be placed inside cavity 30 to heat the water as it flows into the trough. Water inlet and outlet openings 34 and 36, FIG. 3, are provided for attachment of standard pipes to connect heater cavity 30 in the upstream flow to a water valve assembly indicated generally at 38, if heating of the water becomes necessary during the winter season.

Valve assembly 38 is mounted on a bracket 44. Bracket 44 is fastened by bolts 46 to a mounting means 40 which is bolted to L-flanges 24 at 42 and trough 20 at 43.

Figure 4:
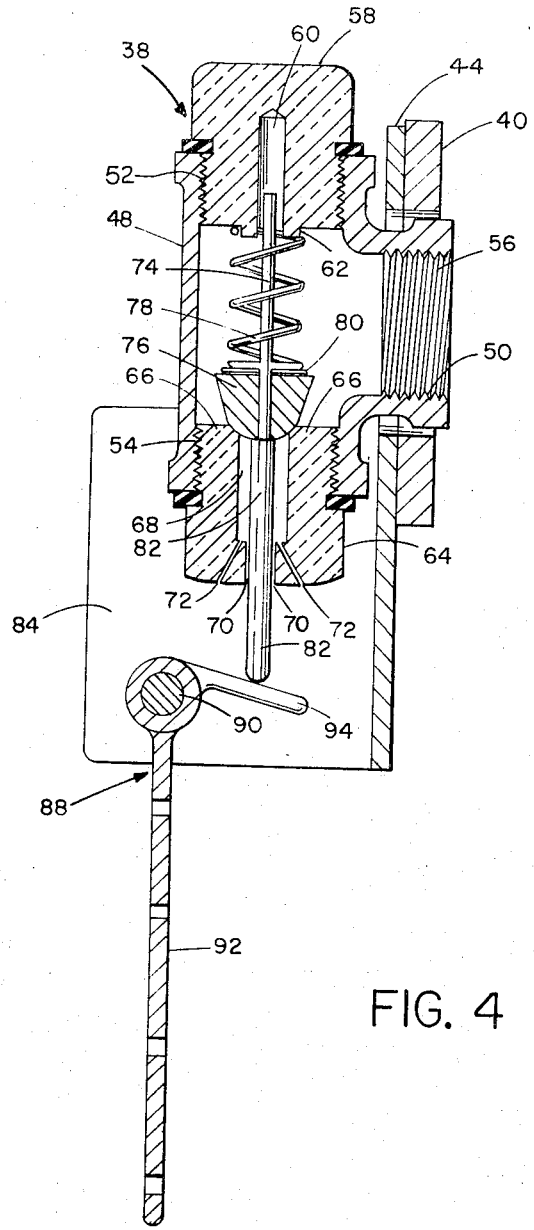
FIG. 4 is a partial side sectional view illustrating the valve assembly of the watering device shown in FIG. 1, the section being taken along the line 4—4 of FIG. 1.

Referring next to FIG. 4, valve assembly 38 includes a T-shaped body 48 having three threaded openings 50, 52, and 54. Opening 50 is the water inlet threaded to receive conventional pipe and extends through a hole 56 provided in mounting means 40 and bracket 44.

A plug 58 is threaded into opening 52 and is provided with a valve guide means 60 and a shoulder 62. Another plug 64 is threaded into opening 54 and includes valve seat 66 on its inner end, a water chamber 68, valve guide means 70, and orifice openings or outlets 72 in its outer end.

Between plugs 58 and 64 is a movable valve element comprising a valve stem 74, the upper end of which fits into guide means 60, and a valve head 76. Valve head 76 is biased against valve seat 66 by spring means 78, the upper end of which fits around shoulder 62 of plug 58 and the lower end resting on washer 80. The tension of spring means 78 may be controlled by use of one or more washers 80 located between spring means 78 and valve head 76.

Still referring to FIG. 4, valve stem 76 is provided with a flanged portion 82 located so as to lift valve head 76 a from valve seat 66 and also to extend through guide means 70.

Referring now to FIGS. 2, 3, and 4, bracket 44 includes two support extensions 84. A valve actuator means in the form of a lever means, indicated generally at 88, is rotatably mounted on a bolt 90 extended through support extensions 84. Lever means 88 comprises a longer lever arm 92 and a shorter arm 94. Shorter arm 94 is disposed at an acute angle with respect to long arm 92 thereby permitting force to be applied on a direct line to the flanged portion 82 of valve stem 74 when inward pressure is applied to long arm 92. It can be readily seen from FIG. 4 that only a small force need be applied to lever arm 92 to move valve head 76 away from valve seat 66 to permit even small animals, such as young hogs, to operate the device.

An adjustable cover plate 95, provided with side flanges 100, FIGS. 1 and 3, partially covers long lever arm 92 and is fastened to mounting means 40 by bolts 96 extended through slots 98 in side flanges 100. It is understood that plate 95 may be vertically adjusted by changing the position of bolts 96 in slots 98.

In operation, the livestock watering device may be placed, for example, in a barn and flanges 24 fastened to a base provided therein. A water supply pipe 73, FIG. 1 is then attached to inlet 50 and the trough 20 is filled manually by applying inward pressure to long lever arm 92. Livestock, hogs, for example, will then drink from the trough and as the water level recedes the animal must move his snout toward the rear because of the rearwardly sloping inner bottom surface. In order to obtain the last portion of water the hog must then press against long lever arm 92 which forces shorter arm 94 upward and in turn pushes valve stem 74 and hence valve head 76 away from valve seat 66. This permits water from supply pipe 73 to flow into water chamber 68 and out of holes 72 into trough 20. Thus the hog may readily learn how to operate the valve mechanism to obtain water.

It is important to point out that the angle of shorter lever arm 94 with respect to longer lever arm 92 and the guide means 60 and 70 reduce side stresses on valve stem 82 and prevent it from deviating from a straight line thus reducing the friction between the moving parts.

It is also important to note that the orifice or outlet portion is stationary which eliminates the possibility of the valve sticking because of corrosion, such sticking being a problem present in prior watering devices.

Adjustable cover plate 95 is positioned to limit the hog's access to the lower portion of long lever arm 92 which forces the hog to keep his nostrils inside the trough. As water flows into the trough and the level rises, the hog must move away from lever arm 92 to keep his nostrils above the water thereby releasing arm 92 which permits the valve head 76 to return to seat 66 to stop the flow of water. This further prevents the overflow of water on to the surrounding area which would be possible if the hog could reach the upper portion of lever arm 92 and maintain pressure against lever arm 92 as the level of the water rises.

When heating the water becomes necessary a dry or submergible type water heater may be mounted in hole 32, FIG. 3, of heater cavity 30 in the bottom of trough 20. Then an inlet pipe is connected to hole 34 and an outlet pipe is connected to hole 36, the latter being connected to inlet 50 of water valve 38. Hence water will be heated in cavity 30 before it enters trough 20.

Now referring to FIGS. 5-8, a modified embodiment of a livestock watering device constructed in accordance with the present invention is illustrated.

Those portions of the embodiment shown in FIGS. 5-8 which are identical to the portions shown in the embodiment illustrated in FIGS. 1-4 are indicated by the same reference numerals.

Figure 5:
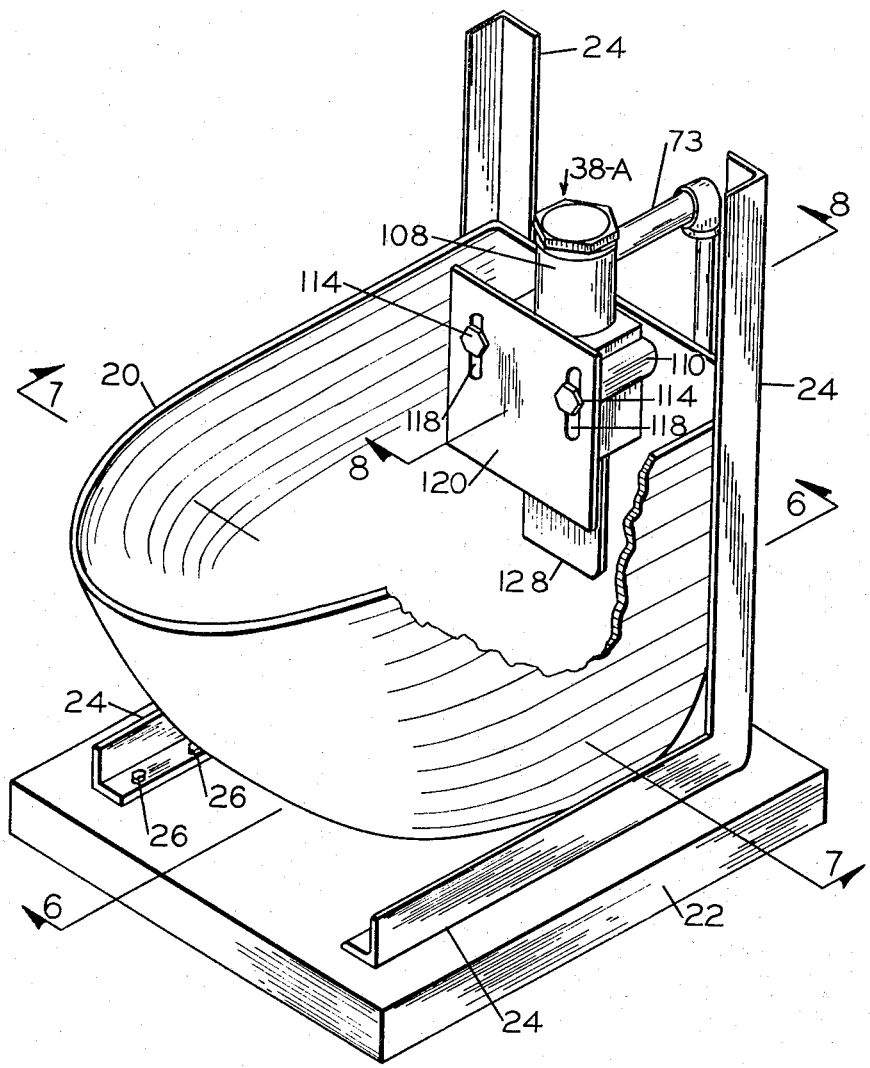
FIG. 5 is a perspective view of another embodiment of a livestock watering device constructed in accordance with the present invention.

As seen in FIG. 5 a water trough or bowl 20 is mounted on a base 22 by L-shaped flanges 24 which are fastened to base 22 by bolts 26.

Figure 6:
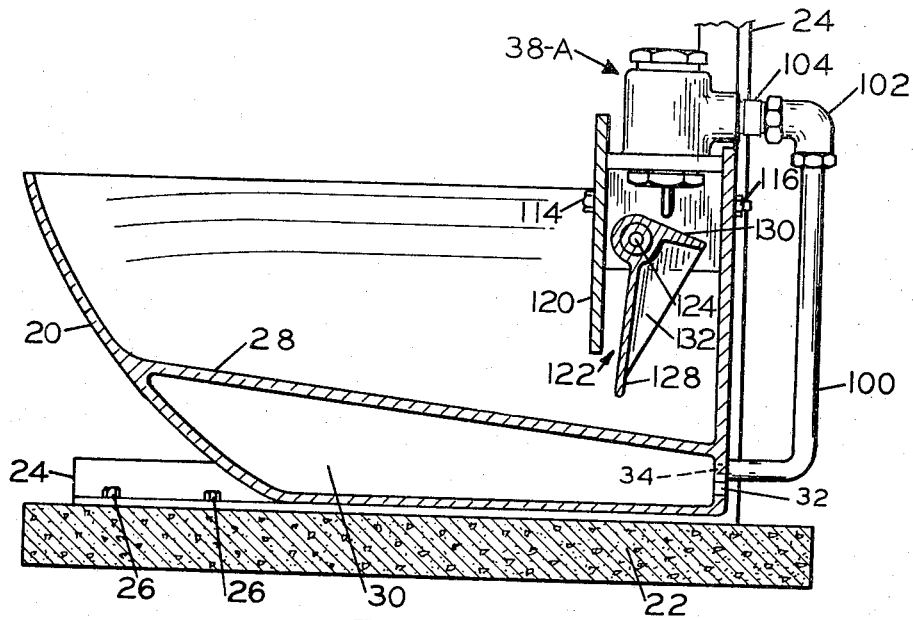
FIG. 6 is a side sectional view of the watering device shown in FIG. 5, the section being taken along lines 6—6 of FIG. 5.
Figure 7:
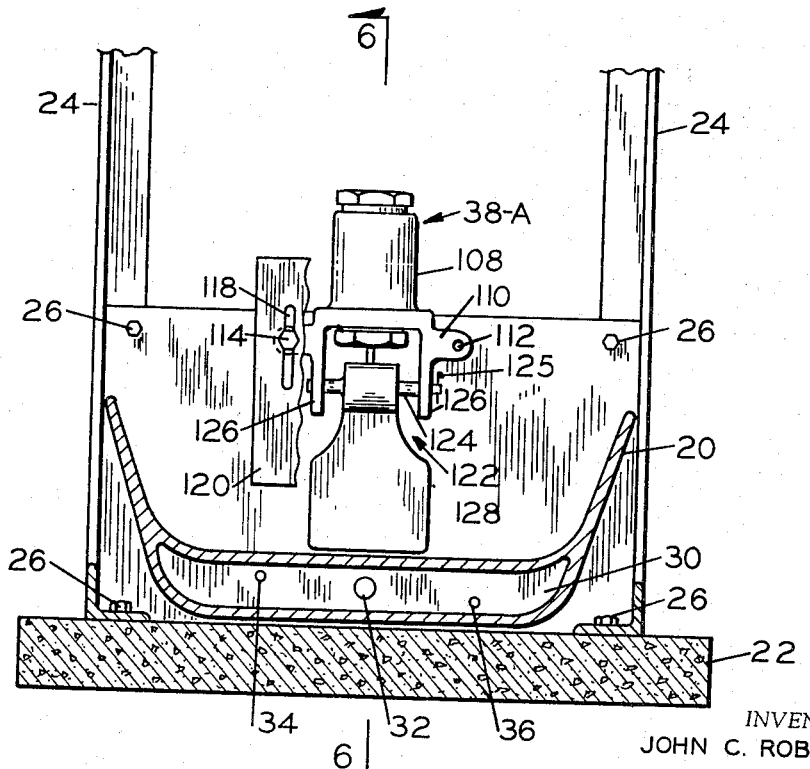
FIG. 7 is a front sectional view of the watering device shown in FIG. 5, the section being taken along line 7—7 of FIG. 5.

As best seen in FIGS. 6 and 7, bowl 20 is provided with an inner bottom surface 28 sloping from front to rear and an integrally formed heater cavity 30 which is located beneath surface 28.

Heater cavity 30 is provided with an opening 32 into which a dry or submergible type heater, now shown, may be inserted. A heating cavity inlet 34 is provided in cavity 30 and is adapted to receive conventional piping, not shown, which is connected to a conventional source of water. A heating cavity outlet 36 is adapted to receive pipe 100 which is connected to an elbow 102 which in turn is connected to another length of pipe 104. Pipe 104 is provided with a male portion which is received by threads 50 of valve inlet 56 of valve assembly 38-A.

It is important to point out that heating cavity 30 is isolated from bowl 20 and therefore no feed, or dirt from the water in bowl 20 can contaminate the heating element disposed in cavity 30.

Valve assembly 38-A differs from valve assembly 38 in FIGS. 1-4 in that is includes a valve body 108 provided with integrally formed flanges 110. Flanges 110 are provided with bores 112 through which bolts 114 extend.

Bolts 114 also extend through the rear portion of bowl 20 and are fastened by nuts 116 to securely mount valve body 108 to bowl 20. In addition, bolts 114 extend through elongated holes 118 provided on adjustable cover plate 120.

The inner valve portions of valve assembly 38-A are identical those in valve assembly 38 of FIGS. 1-4 previously described.

Valve actuator means in the form of a lever means, indicated generally at 112 is mounted on a cross bar 124 which in turn is rotatably mounted through vertically extending flanges 126 provided on valve body 108. A cotter pin 125 is provided to hold bar 124 in place.

Figure 8:
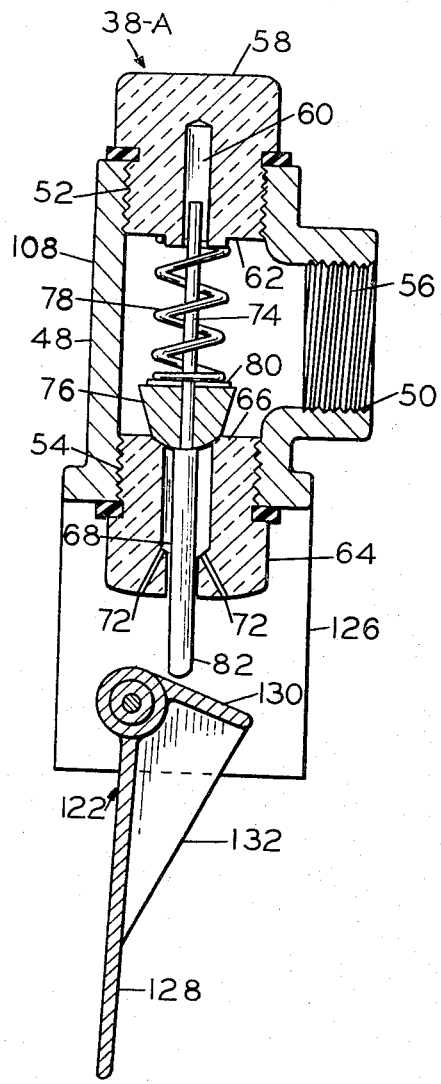
FIG. 8 is a partial side sectional view illustrating the valve assembly of the watering device shown in FIG. 5, the section being taken along the line 4—4 of FIG. 1.

As best seen in FIG. 8, lever means 122 is integrally formed and includes a longer arm 128, a shorter arm 130, and a counterweight portion 132.

Shorter arm 130 is disposed at an acute angle with respect to longer arm 128 to permit force to be applied in a substantially vertical line on flanged portion 82 of stem 74 when inward pressure is applied to arm 128.

Counterweight portion 132 maintains lever means 122 in an attitude such that longer arm 128 is disposed at an angle with the vertical, with the lower end forward. This creates a clearance between short arm 130 and flanged portion 82 when lever means 122 is hanging freely.

It is important to point out that the disposition of lever means 122 as described above permits longer arm 128 to be disposed in a position which is easier reached by young animals and in addition the weight of lever means 22 exerts no pressure on valve stem 74 when not in use.

Since lever means 122 exerts no force on valve stem 74 when hanging freely, spring 78, which biases valve head 76 against valve seat 66 and resists rearward movement of longer arm 128, may be of relatively weak strength, preferably exerting just enough pressure to assure the seating of valve head 76 on valve seat 66. Therefore, it will be understood from the above description that only a very small force must be exerted on longer arm 128 by the animal in order to overcome the biasing force of spring 78 to open the valve. Therefore, even very young animals can easily obtain water because of the small force required to push longer arm 128 rearwardly.

The operation of the embodiment described in FIGS. 5–8 is essentially identical to the operation of the embodiment described in FIGS. 1–4.

In the embodiment shown in FIGS. 5–8, it should be pointed out that valve assembly 38–A is mounted directly on bowl 20 and includes integral formed flanges 110 and 126 which facilitate the mounting of valve body 108, adjustable cover plate 120 and lever means 122.

Further, the embodiment of FIGS. 5–8 clearly illustrates the convenience of integrally formed cavity 30 and the piping connected thereto. In freezing weather, no additional piping is required, the user merely turns on the electrical heating element. In non-freezing weather, the heating element is not turned on and no chnage in the piping connections is required. Water merely passes through cavity 30 before entering bowl 20.

It is important to point out that the construction of valve assembly 38–A and cavity 30 permits a volume of water to be maintained under the bowl 20 at all times. This is especially advantageous under freezing conditions when the water in cavity 30 is being heated as any water in the piping or valve assembly is in direct contact with the heated water. Thus by convection the water left in the piping 100, 102 and 104 and in valve assembly 38–A above valve head 76 will be heated therefore freezing in this area is less likely to occur.

Further, the volume of heated water in cavity 30 being disposed directly below bowl 20 furnishes heat by conduction through bottom surface 28 to water left standing in bowl 20. This minimizes the possibility of water freezing when left standing in bowl 20.

While the forms of embodiments of the present invention as herein disclosed constitutes preferred forms, it is to be understood that other forms might be adopted, all coming within the scope of the claims which follow.

I claim:

1. A livestock watering device comprising, in combination, a watering trough including structure providing an integrally formed heating cavity adapted to receive a heating element, said cavity disposed directly below and in heat transmitting relationship with the bottom surface of said trough and including a water inlet and a water outlet; valve means mounted on said trough including a movable valve element comprising a vertically disposed valve stem, a valve head, means for biasing said valve head toward a valve seat and a valve inlet passage and a valve outlet passage communicating with said valve inlet passage and said trough; valve actuating means mounted within said trough for controlling said valve element; and conduit means connecting said heating cavity outlet with said valve inlet.

2. The device defined in claim 1 wherein said trough is provided with a rearwardly sloping inner bottom surface.

3. The device defined in claim 1 wherein said actuating means includes a lever means pivotally mounted on said valve means including a longer arm disposed in said trough and a shorter arm engageable with said valve stem.

4. A livestock watering device comprising, in combination, a watering trough including structure providing an integrally formed heating cavity adapted to receive a heating element, said cavity including a water inlet adapted to be connected to a water supply and a water outlet; valve means mounted on said trough including a valve element, a valve inlet passage and a valve outlet passage communicating with said valve inlet passage and said trough; a conduit connecting said water outlet to the valve inlet, valve actuating means including an integrally formed lever means pivotally mounted on said valve means, said lever means including a longer arm disposed within said trough and a shorter arm engageable with said valve element; and a vertically adjustable cover plate mounted on said valve assembly and partially covering said longer arm for limiting the livestock's access to said lever means.

5. A livestock watering trough comprising, in combination, mounting means for attachment to the rear of said trough; a valve assembly mounted to said mounting means and including a vertically movable valve element biased toward a valve seat, an inlet passage and an outlet passage communicating with said inlet passage and said trough; and lever means pivotally mounted in said trough and including a longer arm and a shorter arm movable into force transmitting engagement with said valve element for forcing said valve element away from said valve seat, said shorter arm including a counterweighted portion to normally dispose said shorter arm in a rearwardly inclined position directly below but spaced from said valve element and said longer arm in a forwardly inclined position with respect to said shorter arm.

References Cited

UNITED STATES PATENTS

| 2,162,314 | 6/1939 | Perri | 119—73 |
| 2,665,366 | 1/1954 | Cleveland | 119—73 X |
| 3,049,094 | 8/1962 | Smith | 119—75 |
| 3,144,853 | 8/1964 | Blough | 119—75 |

FOREIGN PATENTS

| 175,579 | 5/1935 | Switzerland. |
| 194,334 | 2/1938 | Switzerland. |
| 677,943 | 8/1952 | Great Britain. |

HUGH R. CHAMBLEE, *Primary Examiner.*

SAMUEL KOREN, *Examiner.*